US009669795B2

(12) United States Patent
Wang et al.

(10) Patent No.: US 9,669,795 B2
(45) Date of Patent: Jun. 6, 2017

(54) DUAL STAGE HYBRID INFLATOR AND METHOD OF TRIGGERING THE SAME

(71) Applicant: MOSA INDUSTRIAL CORPORATION, Huwei Township, Yunlin County (TW)

(72) Inventors: Teh-Hsin Wang, Taoyuan (TW); Long-Ming Tsai, Taipei (TW); Chia-Jung Lin, Taichung (TW); Han-Le Wang, Xingang Township, Chiayi County (TW); Yun-Hsien Lin, Taichung (TW)

(73) Assignee: MOSA INDUSTRIAL CORPORATION, Yunlin County (TW)

( * ) Notice: Subject to any disclaimer, the term of this patent is extended or adjusted under 35 U.S.C. 154(b) by 3 days.

(21) Appl. No.: 14/752,423

(22) Filed: Jun. 26, 2015

(65) Prior Publication Data

US 2016/0167617 A1 Jun. 16, 2016

(30) Foreign Application Priority Data

Dec. 12, 2014 (TW) .............................. 103143565 A

(51) Int. Cl.
*B60R 21/263* (2011.01)
*B60R 21/264* (2006.01)
(Continued)

(52) U.S. Cl.
CPC .......... *B60R 21/263* (2013.01); *B60R 21/013* (2013.01); *B60R 21/264* (2013.01);
(Continued)

(58) Field of Classification Search
None
See application file for complete search history.

(56) References Cited

U.S. PATENT DOCUMENTS 7,806,954 B2* 10/2010 Quioc ................. B60R 21/2644
102/202.14
7,883,111 B2* 2/2011 Blessing ............. B60R 21/2644
102/530

(Continued)

FOREIGN PATENT DOCUMENTS

CN 101137525 A 3/2008
EP 0901432 B1 6/1997
(Continued)

*Primary Examiner* — Truc M Do
(74) *Attorney, Agent, or Firm* — Muncy, Geissler, Olds & Lowe P.c.

(57) ABSTRACT

A dual-stage hybrid inflator and triggering a method thereof are provided. The dual-stage hybrid inflator includes a main casing, a central pipe, and a disc set, a first propellant chamber assembly, a second propellant chamber assembly, a pressurized gas, a first igniter assembly, a second igniter assembly and an exhaust hood. The main casing includes a bottom housing and an upper housing. The central pipe is fixed with the bottom housing and passed through the upper housing. A convective hole is disposed on the central pipe. The disc set, which is used to prevent the gas escaping from the main casing, is disposed on the top of the central pipe. The doublet propellant chamber, which is filled with different dosage of propellant, is initiated by the igniters disposed thereon in order to generate various degrees of gas depended on various degrees of collision.

6 Claims, 6 Drawing Sheets

(51) Int. Cl.
*B60R 21/272* (2006.01)
*B60R 21/013* (2006.01)
*B60R 21/276* (2006.01)
B60R 21/01 (2006.01)
B60R 21/26 (2011.01)

(52) U.S. Cl.
CPC .......... *B60R 21/272* (2013.01); *B60R 21/276* (2013.01); *B60R 2021/01211* (2013.01); *B60R 2021/26029* (2013.01); *B60R 2021/2633* (2013.01); *B60R 2021/2642* (2013.01); *B60R 2021/26076* (2013.01)

(56) References Cited

U.S. PATENT DOCUMENTS

| | | | | |
|---|---|---|---|---|
| 8,740,245 | B2* | 6/2014 | Fukawatase | B60R 21/2644 280/736 |
| 8,827,308 | B1* | 9/2014 | Lewis | B60R 21/263 102/530 |
| 8,979,121 | B2* | 3/2015 | Smith | F42B 3/04 102/530 |
| 9,295,935 | B1* | 3/2016 | Adamczyk | B01D 46/0097 |
| 2004/0046373 | A1 | 3/2004 | Wang et al. | |
| 2006/0267322 | A1* | 11/2006 | Eckelberg | B60R 21/26 280/736 |
| 2007/0075536 | A1* | 4/2007 | Kelley | B60R 21/272 280/737 |
| 2007/0085309 | A1* | 4/2007 | Kelley | B60R 21/272 280/736 |
| 2008/0136152 | A1* | 6/2008 | McFarland | B60R 21/2644 280/736 |
| 2009/0288574 | A1* | 11/2009 | Jackson | B60R 21/263 102/530 |
| 2010/0071580 | A1* | 3/2010 | Nakayasu | B60R 21/261 102/530 |
| 2011/0221176 | A1* | 9/2011 | Bierwirth | B60R 21/2644 280/741 |
| 2011/0254254 | A1* | 10/2011 | Numoto | B60R 21/263 280/741 |

FOREIGN PATENT DOCUMENTS

| | | |
|---|---|---|
| EP | 1371526 A2 | 5/2003 |
| TW | I-449639 B | 8/2014 |

* cited by examiner

DUAL STAGE HYBRID INFLATOR AND METHOD OF TRIGGERING THE SAME

CROSS-REFERENCE TO RELATED APPLICATION

This application claims priority from Taiwan Patent Application No. 103143565, filed on Dec. 12, 2014, in the Taiwan Intellectual Property Office, the contents of which are hereby incorporated by reference in their entirety for all purposes.

BACKGROUND OF THE INVENTION

1. Field of the Invention

This application relates to a dual-stage hybrid inflator which is filled with pressurized gas and different dosage of propellant and is initiated by igniters disposed thereon, so as in order to generate various degrees of gas depended on various degrees of collision.

2. Description of the Related Art

An airbag system is known as standard equipment for automobiles, and an inflator equipped is capable of inflating the airbag quickly to provide a buffering space, which is provided for protecting passengers or drivers during occurrence of a car accident.

There are three main methods of inflating the automobile airbags as described below. In first method, a gas-compressed air inflator uses a pressurized gas stored in an air cylinder as a gas source for inflating the airbag and the pressurized gas is released rapidly when the gas is needed. However, such inflator has the drawbacks of requiring a relatively larger gas storage and pressure, and thus causing greater volume, thickness and weight of the air cylinder and incurring a higher cost and more limitation on its application. In second method, a pyrotechnic inflator fills propellant therein, and the igniter will ignite the propellant to produce gas and fill up an airbag. However, such inflator has the drawback of producing a high temperature gas which may damage the airbag easily or burn or injure the passengers, and the solid residue and toxic gases remained after the combustion jeopardize our health and environment. In third method, a hybrid inflator fills with few propellant and pressurized gas, so as to achieve the effects of the aforementioned two types of inflators, preventing accidents caused by the too-high temperature, and providing an easier installation due to the smaller and lighter air cylinder. However, this kind of hybrid inflator has more complicated structure and design, and specific manufacturing process is needed such that application thereof can be made.

However, such hybrid inflator is limited by the amount of propellants and the sealing technology of the pressurized gas cylinder. The conventional dual-stage inflator can be combined with various sensors to release adequate amount of gas, and the airbag with a better protection effect can be provided. The hybrid inflator, nonetheless, the filled propellant is covered by high pressurized gas, which has higher burning quality. If a dual-stage one is provided, the second-stage propellant may be ignited accidentally in the process of the first-stage operation. As a result, many factors must be taken into consideration to produce a dual-stage inflator as it is relatively of more difficult manufacturing technique, and costs much higher, and thus lacks for practicability.

Based on the foregoing reasons, the inventor of the present invention designs a dual-stage hybrid inflator, in hopes of overcoming the drawbacks of the prior art and improving the industrial application.

SUMMARY OF THE INVENTION

In view of the aforementioned technical problems, the present disclosure is to provide a dual-stage hybrid inflator which is to integrate the disposition of the related components in a limited space so as to reach the purpose of a microminiaturized design and thereby to promote the convenience of assembly, as well as to lower the manufacturing cost.

In view of the aforementioned technical problems, the present disclosure is to provide a dual-stage hybrid inflator which is to fill pressurized gas and different dosage of propellant by a doublet propellant chamber so as to provide various degrees of gas to cope with various degrees of collision.

In view of the aforementioned technical problems, one purpose of the present disclosure is to provide a dual-stage hybrid inflator which may use members such as a cup body of a propellant chamber, a cushion ring, a cup cover, and so on to provide an accommodating space for filling the propellant. By partitioning members of the propellant chamber, it can prevent the slag from sputtering in the process of welding and joining the propellant to cause burning accidently, so as to promote the safety for manufacturing and assembling.

According to the preceding purpose, the present disclosure is to provide a dual-stage hybrid inflator which may include a main casing, a central pipe, and a disc set, a first propellant chamber assembly, a second propellant chamber assembly, a pressurized gas, a first igniter, a second igniter and an exhaust hood. The main casing may include a bottom housing and an upper housing, and the upper housing may be fixed at a top of the bottom housing relatively and the upper housing together with the bottom housing to form a complete sealed casing, a bottom wall of the bottom housing may be disposed with a first ignition hole and a second ignition hole, and a top wall of the upper housing may be disposed with a through hole.

The central pipe may be a hollow pipe, a bottom of the central pipe may be fixed onto the bottom housing relatively, an upper end of the central pipe may penetrate the through hole relatively to fix with the upper housing, and a pipe wall of the central pipe may have a plurality of convective holes. The disc set may be disposed at a top of the central pipe relatively to prevent the gas in the main casing from escaping, and the disc set is separated from the top of the central pipe when an inner side of the disc set is pushed with a certain degree of force.

A first propellant chamber assembly may include a cushion ring and a first cup cover. The cushion ring may be disposed at an internal circular wall of the bottom housing relatively, a center of the first cup cover may be disposed with a sheath opening sheathed on the central pipe relatively, the first cup cover may be disposed at a top of the cushion ring so as to form the first propellant chamber with the bottom housing, and the first propellant chamber may be disposed with a propellant having a first dosage. A second propellant chamber assembly may be disposed at the bottom housing and may include a cup body of a second propellant chamber and a second cup cover. The cup body of the second propellant chamber may have a through hole fixed with the second ignition hole relatively, the cup body of the second propellant chamber may be filled with a propellant having a second dosage, and the second cup cover may have a shape matching with a shape of the cup body of the second propellant chamber, and may cover the cup body of the second propellant chamber.

A first igniter assembly may penetrate the first ignition hole to be disposed in a first propellant chamber, for producing first ignition airflow after receiving a first ignition signal, so as to further trigger the propellant having the first dosage to burn. A second igniter assembly may penetrate the second ignition hole and the through hole to be disposed in the cup body of the second propellant chamber, for producing second ignition airflow after receiving a second ignition signal, so as to further trigger the propellant having the second dosage to burn. An exhaust hood may be sheathed and fixed on the main casing relatively, and a deposition space may be formed between the exhaust hood and the main casing for accommodating a solid residue produced after burning, and the exhaust hood having a plurality of exhaust holes for exhausting gas.

The present disclosure further provides a method of triggering a dual-stage hybrid inflator which may be applicable to an automobile equipped having an airbag with the dual-stage hybrid inflator. The automobile may include a sensor, a configuration unit and a processing unit, and the method may be referred as follows. The sensor may be used to detect a driving condition of the automobile and to summarize the driving condition as driving information. The configuration unit may be used to configure a first signal threshold value and a second signal threshold value. The processing unit may be configured to receive the driving information and to analyze and determine the driving information so as to produce a corresponding first ignition signal or a second ignition signal; wherein when the driving information exceeds the first signal threshold value, the processing unit may transmit the first ignition signal to trigger a propellant having the first dosage filled in the dual-stage hybrid gas generator to burn so as to complete a first inflation mode of the airbag; and when the driving information exceeds the second signal threshold value, the processing unit may transmit the first ignition signal and the second ignition signal to trigger all the propellants filled in the dual-stage hybrid inflator to burn so as to complete a second inflation mode of the airbag.

The primary purpose of the present disclosure is to provide a dual-stage hybrid inflator and a method of triggering the same. The present disclosure may have the following advantages.

The first advantage is improvement of the protection of the second propellant chamber. By using an individual second propellant chamber, the propellant having the second dosage can be protected fully, and it can also avoid the thermal airflow generated in the triggering method of the first propellant chamber burning the propellant filled in the cup body of the second propellant chamber accidently.

The second advantage is the microminiaturized design for the dual-stage hybrid inflator. By using the relative arrangement of the propellant chambers and the igniters, the assembly can be made in a limited space to accomplish the purpose of microminiaturization, and effectively improve the drawback that a larger volume to the conventional inflator is necessary.

The third advantage is increasing of convenience. As the whole structure is microminiaturized, the convenience of assembly is increased greatly. In addition, the microminiaturized design boosts the various applications of a dual-stage hybrid inflator and a triggering method thereof in accordance with the present disclosure such that it can be thereby popularized to the other applied fields.

The fourth advantage is promotion of security for the assembly. By using structures such as a cushion ring, a cup body of a propellant chambers, a cup cover, and so on to prevent the propellant from being contacted with the main casing directly, it can prevent the slag from sputtering in the welding joining process of assembling the components such as the bottom housing, upper housing, central pipe, disc set, and so on to cause burning accidently, so as to promote the security for manufacturing and assembling.

The fifth advantage is promotion of the usage security. By using a dual-stage triggering method, it can trigger an adequate inflation according to the practical degree of collision to efficiently resolve the technical problem concerning that the conventional inflator may be squeezed overly as an excessive inflation. Preferably, by means of the hybrid design, it can reduce the temperature of gas in the triggering method via the pre-filled high-pressure gas to prevent too-high temperature of the inflation gas from damaging the airbag system to result in a secondary injury such as a burn, and so on.

BRIEF DESCRIPTION OF THE DRAWINGS

Hereinafter, embodiments of the present disclosure will be described in detail with reference to the accompanying drawings so that those skilled in the art to which the present disclosure pertains can realize the present disclosure, wherein.

DETAILED DESCRIPTION OF THE PREFERRED EMBODIMENTS

Figure 1:
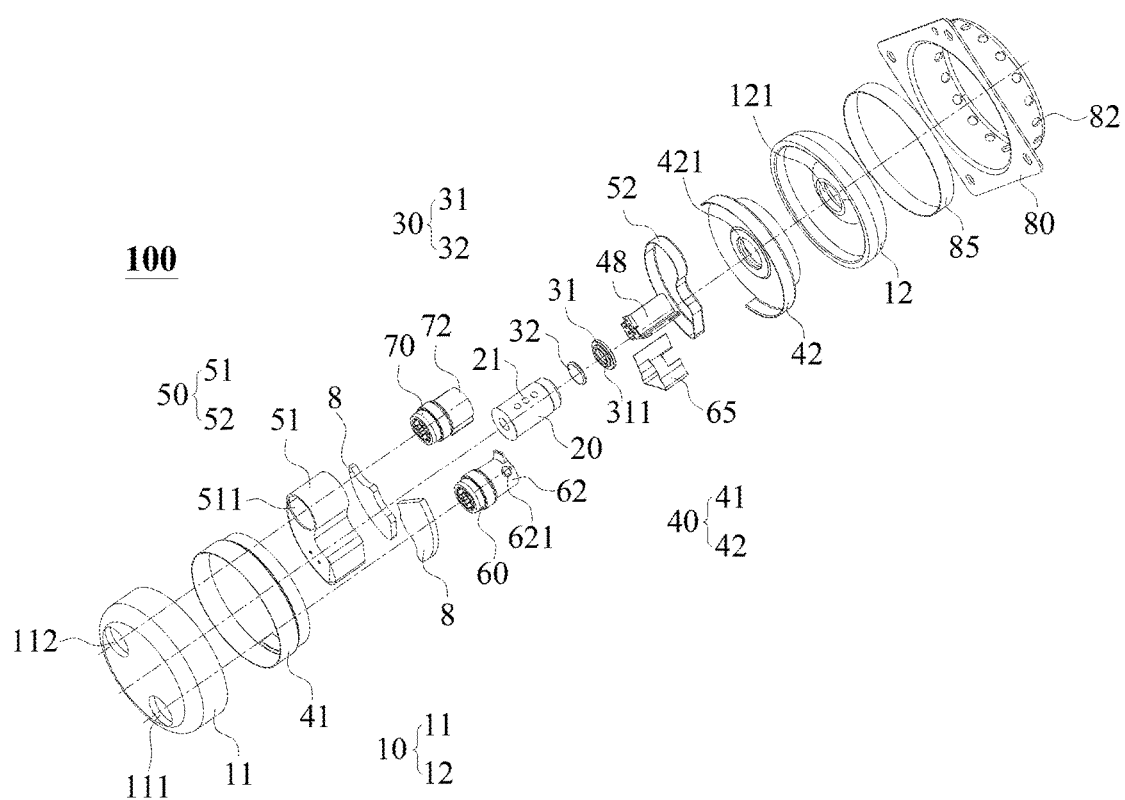
FIG. 1 is an explosion diagram for showing the components of a dual-stage hybrid inflator of the present disclosure.
Figure 2:
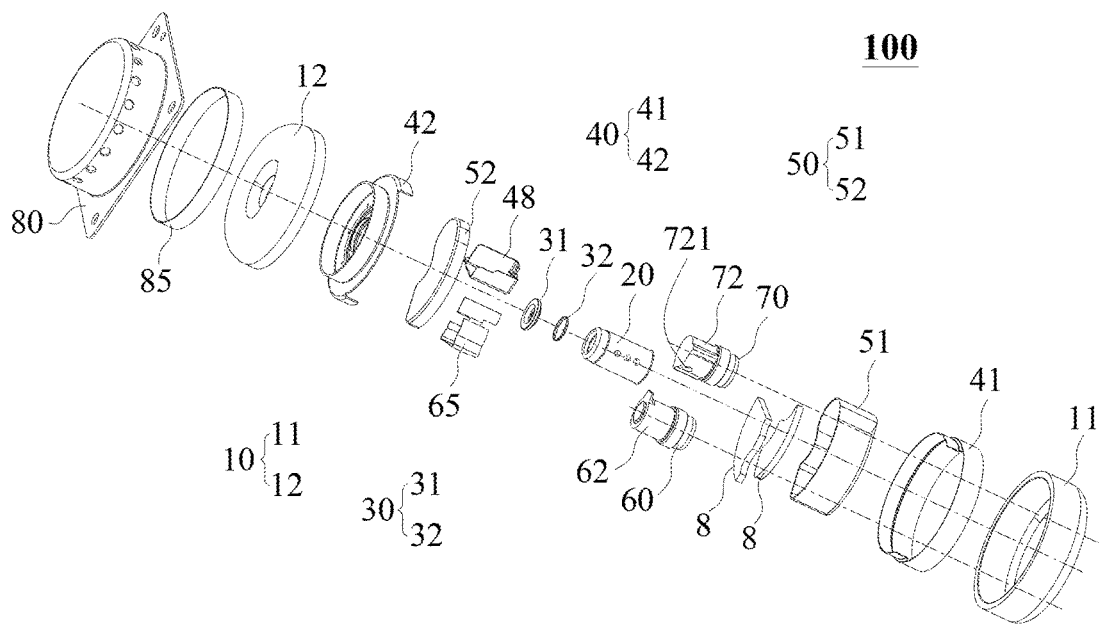
FIG. 2 is another view of an explosion diagram for showing the components of a dual-stage hybrid inflator of the present disclosure.
Figure 3:
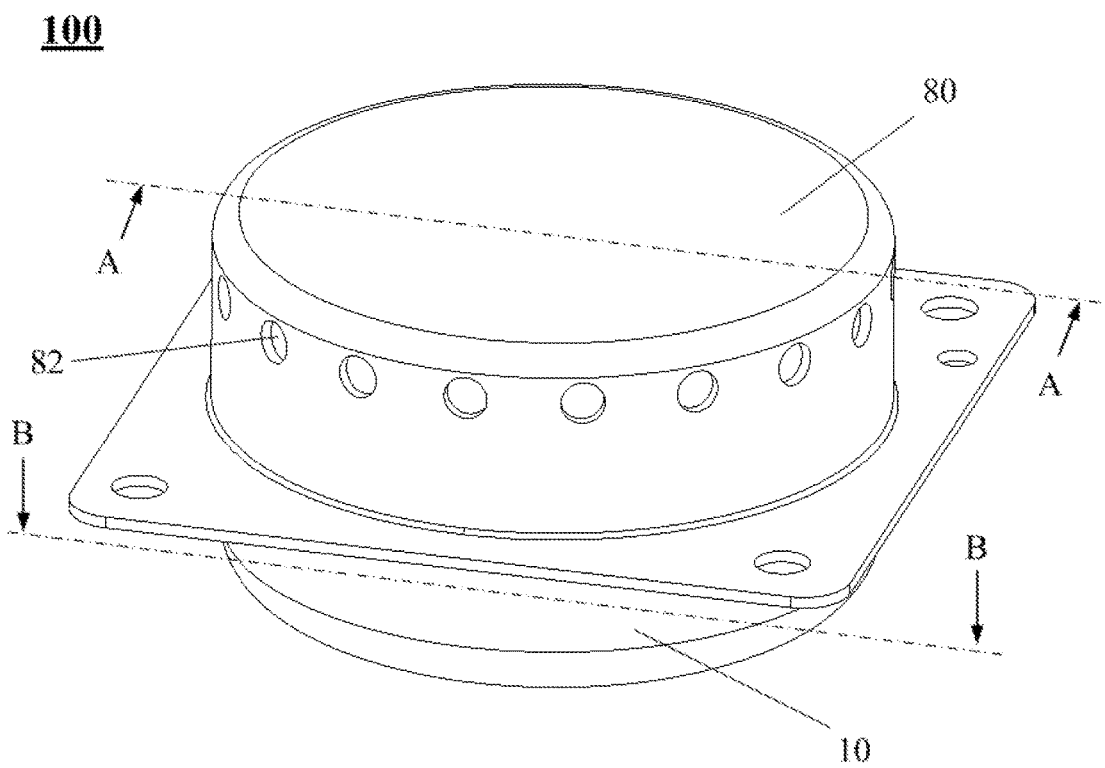
FIG. 3 is an assembly diagram of a dual-stage hybrid inflator of the present disclosure.
Figure 4:
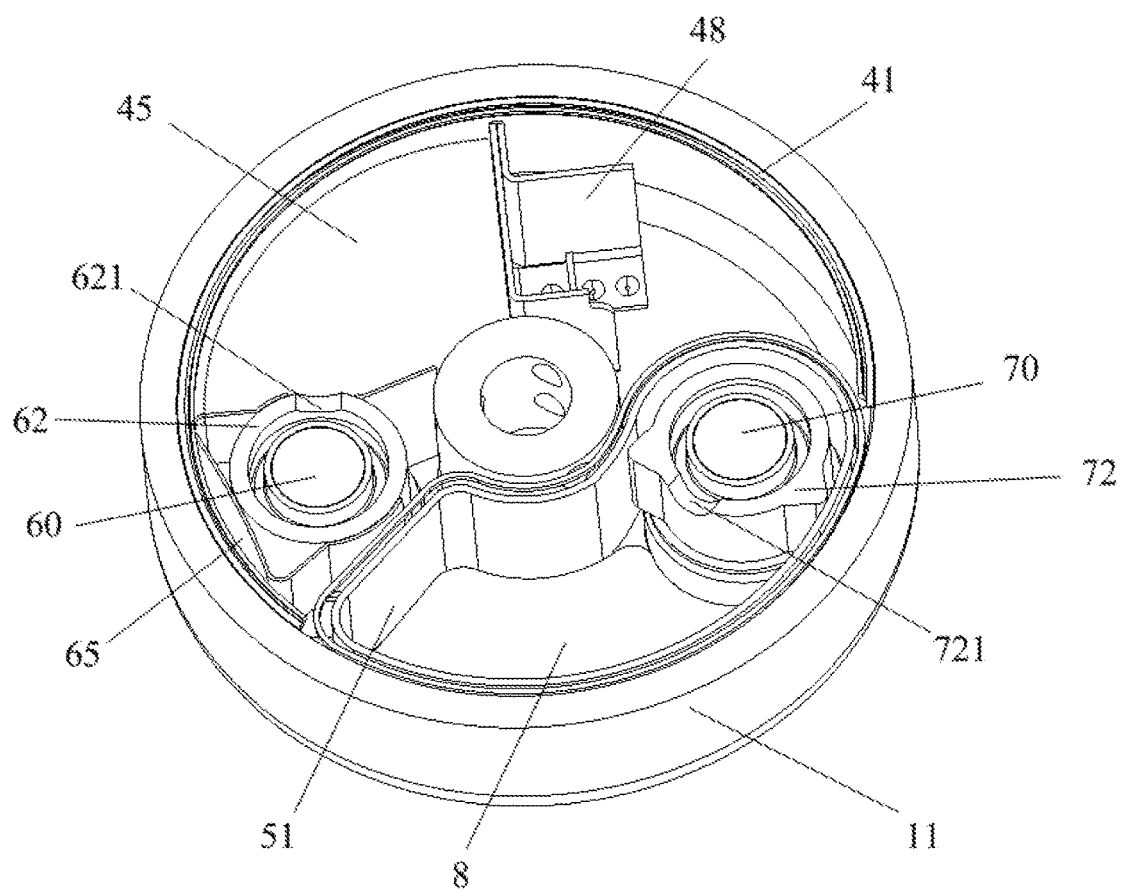
FIG. 4 is an A-A cross-sectional schematic diagram of an assembly diagram of a dual-stage hybrid inflator of the present disclosure.
Figure 5:
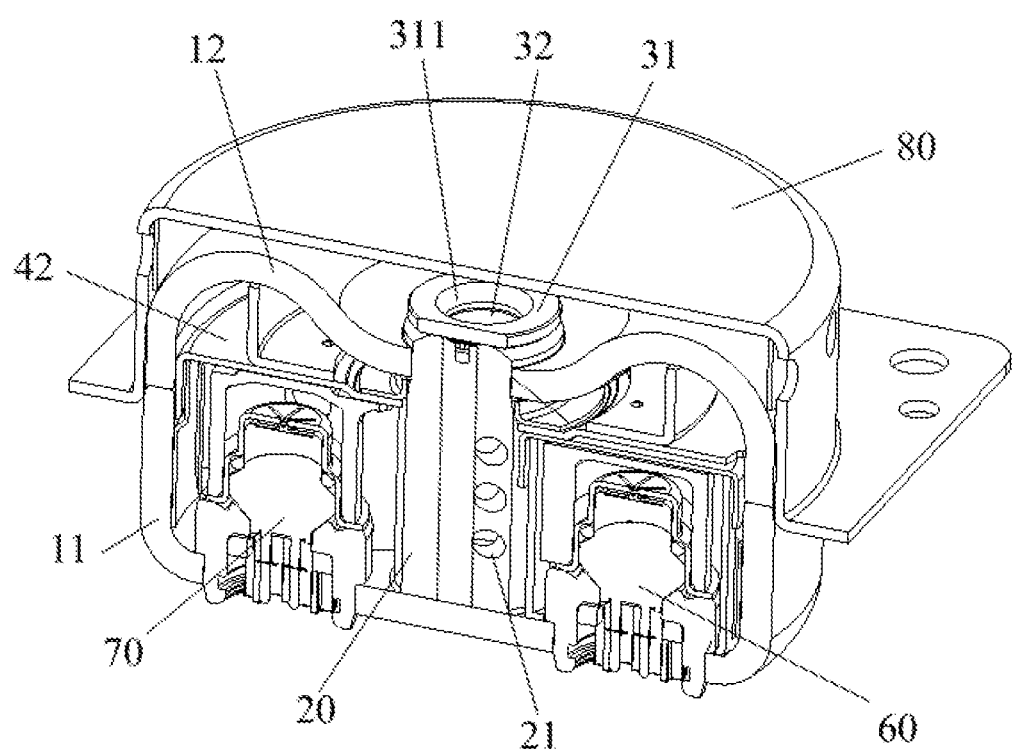
FIG. 5 is a B-B cross-sectional schematic diagram of an assembly diagram of a dual-stage hybrid inflator of the present disclosure.

Compared with the convention single-stage inflator, the difference of the present disclosure depends on that a doublet propellant chamber is used to fill with different dosage of propellant. In addition, the different ignition signals are used to indicate the inflation selectively, so as to provide the airbag system for an adequate inflation to further accomplish an optimal protection effect.

Please refer to FIG. 1 through FIG. 5 together. A dual-stage hybrid inflator 100 may include a main casing 10, a central pipe 20, a disc set 30, a first propellant chamber assembly 40, a second propellant chamber assembly 50, a first igniter assembly 60, a second igniter assembly 70 and an exhaust hood 80.

The main casing 10 may include a bottom housing 11 and an upper housing 12. In practice, the bottom housing 11 may be a half-casing with a circular cross-section and a space enclosed therein, and a first ignition hole 111 and a second ignition hole 112 may be disposed at a bottom wall of the bottom housing 11. The upper housing 12 may be disposed relatively to the bottom housing 11, and a top wall may be disposed with a concaved through hole 121 to enable the central pipe 20 passing through, so as to be connected and fixed. In practice, the upper housing 12 may be fixed at a top of the bottom housing 11 relatively to cooperate with the bottom housing 11 to form a complete sealed housing to demonstrate a discoid-like structure, such that the micro-miniaturized design is applicable to be equipped in the small space in front seat of an automobile, and the convenience of assembly and practicability can be thereby promoted.

The central pipe 20 may be a hollow pipe, a bottom of central pipe 20 may be fixed onto bottom housing 11 relatively, an upper end of central pipe 20 may penetrate the through hole 121 correspondingly and may be fixed with the upper housing 12, and the central pipe 20 may be provided with a plurality of convective holes 21 at a pipe wall thereof.

Preferably, the dual-stage hybrid inflator 100 of the present disclosure may further include a vent pipe (not shown in FIGs). The vent pipe may be sheathed and fixed at external side of central pipe 20 relatively, and a plurality of throttle bores may be provided to penetrate through the vent pipe. In practice, the plurality of throttle bores may not be aligned with the plurality of convective holes 21 such that the gas generated in the process of burning can be throttled down while flowing from the vent pipe to central pipe 20. Moreover, the burnt slag of the propellant can be filtered. In practice, by adjusting the location and the diameter of the plurality of throttle bores, it can control the burning time, adjust the output air-pressure, and reduce the sonic boom decibels, and so on, caused in the process of powder burning.

The disc set 30 may be disposed at a top of central pipe 20 to prevent the gas in the main casing 10 from escaping. In practice, the disc set 30 may include a sealing cover 31 and a sealing sheet 32. The sealing cover 31 may have a port 311 and may be fixed at the top of central pipe 20, and sealing sheet 32 may be relatively fixed onto port 311 of sealing cover 31 to prevent the gas in the main casing 10 from escaping. The pre-filled gas may also be capable of preventing the propellant from being contacted with oxygen and moisture to cause oxidation reaction, resulting that the burning rate is affected.

The sealing sheet 32 has sufficient strength to satisfy with the demand of gas tightness even in an inoperative situation. However, when the propellant filled in the propellant chamber is burning, the generated thermal airflow may be guided to push the inner side of the sealing sheet 32 via the central pipe 20. As a result, when the push force towards the inner side of the sealing sheet 32 exceeds the strength of the material of the sealing sheet 32, the sealing sheet 32 is broken open, thereby guiding a airflow flow through an exhaust hood 80 and then into the airbag that is to be inflated, so as to accomplish purpose of inflating instantly.

The first propellant chamber assembly 40 may include a cushion ring 41 and a first cup cover 42. The cushion ring 41 may be disposed at an internal circular wall of bottom housing 11 relatively, a center of first cup cover 42 may be disposed with a sheath opening 421 sheathed on central pipe 20 relatively, first cup cover 42 may be disposed at a top of cushion ring 41, and first cup cover 42 may simultaneously cover a second cup cover 52. In practice, a first propellant chamber 45 may be formed by cushion ring 41, first cup cover 42 and bottom housing 11, and a propellant having a first dosage may be filled in first propellant chamber 45. In practice, first propellant chamber assembly 40 may further include an adjustment plate 48, and adjustment plate 48 may be used to adjust the accommodating space of first propellant chamber 45, so as to adjust the propellant having the first dosage.

The second propellant chamber assembly 50 may be disposed at bottom housing 11, and second propellant chamber assembly 50 may include a cup body of second propellant chamber 51 and second cup cover 52. A cup body of the second propellant chamber 51 may have a through hole 511 fixed with a second ignition hole 112 relatively. In practice, the structure of through hole 511 and second ignition hole 112 may be stacked up to form a path which can be penetrated and fixed by second igniter assembly 70. The second cup cover 52 may be shaped to cup body of second propellant chamber 51 relatively, and may cover cup body of second propellant chamber 51. In practice, the cup body of the second propellant chamber 51 may be filled with a propellant having a second dosage according to the practical needs to produce a corresponding degree of inflation.

Furthermore, the first cup cover 42 may be further disposed with a circular support plate to be supported between upper housing 12 and first cup cover 42, and the circular support plate may provide a support force to prevent the first cup cover 42 from being shaken due to vibration of the main casing 10. The first cup cover 42 may cover second cup cover 52 to minimize the gap between cup body of second propellant chamber 51 and second cup cover 52 such that the thermal airflow generated during the operation of the propellant filled in first propellant chamber 45 flowing into cup body of second propellant chamber 51 can be avoided, so as to prevent the propellant having the second dosage from being burnt accidently.

In practice, the first cup cover 42 and the cushion ring 41, as well as the cup body of the second propellant chamber 51 and the second cup cover 52 may be removable. When the propellant is burnt, the process gas may be discharged from the propellant chamber to flow through central pipe 20, so as to perform inflation.

To be more precisely, height of the cushion ring 41 may be higher than that of bottom housing 11 slightly, so an insulating layer may be formed on a joint face of bottom housing 11 and upper housing 12. When the bottom housing 11 and upper housing 12 are connected by welding joining, the insulating layer can prevent the slag from sputtering to burn the propellant filled in the propellant chamber accidently.

In practice, a buffer pad 8 can further be disposed at a bottom of the first propellant chamber 45 and/or a bottom of the cup body of second propellant chamber 51 for preventing the propellant from being broken by vibration, and to ensure that the burning rate of the propellant may not be affected so as to maintain an adequate inflation rate. Preferably, the buffer pad 8 may include a ceramic fiber pad, a crotch pad or a thermal rubber pad.

The first igniter assembly 60 may penetrate the first ignition hole 11 to be disposed in First propellant chamber 45, for producing a first ignition airflow after receiving a first ignition signal, so as to further trigger the propellant having the first dosage to burn. In practice, the first igniter assembly 60 may further include a first indicator 62 which may be sheathed and fixed onto first igniter assembly 60. The first indicator 62 may be a hollow casing and a first guiding aperture 621 may be provided to penetrate a wall surface at one side of first indicator 62, and a direction of the first ignition airflow is guided by first guiding aperture 621 to gradually burn the propellant having the first dosage filled in first propellant chamber 45 according to set burning rate. In practice, the first igniter assembly 60 may further include a baffle plate 65, and baffle plate 65 may be disposed at external side of first indicator 62 to limit the arrangement of the propellant. Therefore, the abnormal sound caused as displacement of the propellant as well as the negative effect upon the efficiency of inflation can be prevented.

The second igniter assembly 70 may penetrate the second ignition hole 112 and the through hole 511 to be disposed in cup body of second propellant chamber 51, for producing second ignition airflow after receiving a second ignition signal, so as to further trigger the propellant having the second dosage to burn. Similarly, the second igniter assembly 70 may further include a second indicator 72, and a second guiding aperture 721 disposed at wall face of second indicator 72 may be used to guide a second direction of the second ignition airflow.

The exhaust hood 80 may be sheathed and fixed on the main casing 10 relatively, and may be fixed by welding joining. A deposition space may be formed between exhaust hood 80 and main casing 10 for accommodating a solid residue produced after burning, and exhaust hood 80 having a plurality of exhaust holes 82 for exhausting gas. In practice, the plurality of exhaust holes 82 may be disposed evenly around exhaust hood 80 to release the process gas to break disc set regularly, such that the airbag can be inflated evenly and rapidly to provide an optimal protection effect.

The exhaust hood 80 may further include a filter 85. By using the filter 85, the burnt solid slag can be filtered to reduce the amount of the slag entering the airbag and avoid the solid slag penetrating the airbag as airflow to cause the secondary injure. The exhaust hood 80 may further include a fixed part being fixed on a mounting part of the airbag relatively.

Figure 6:
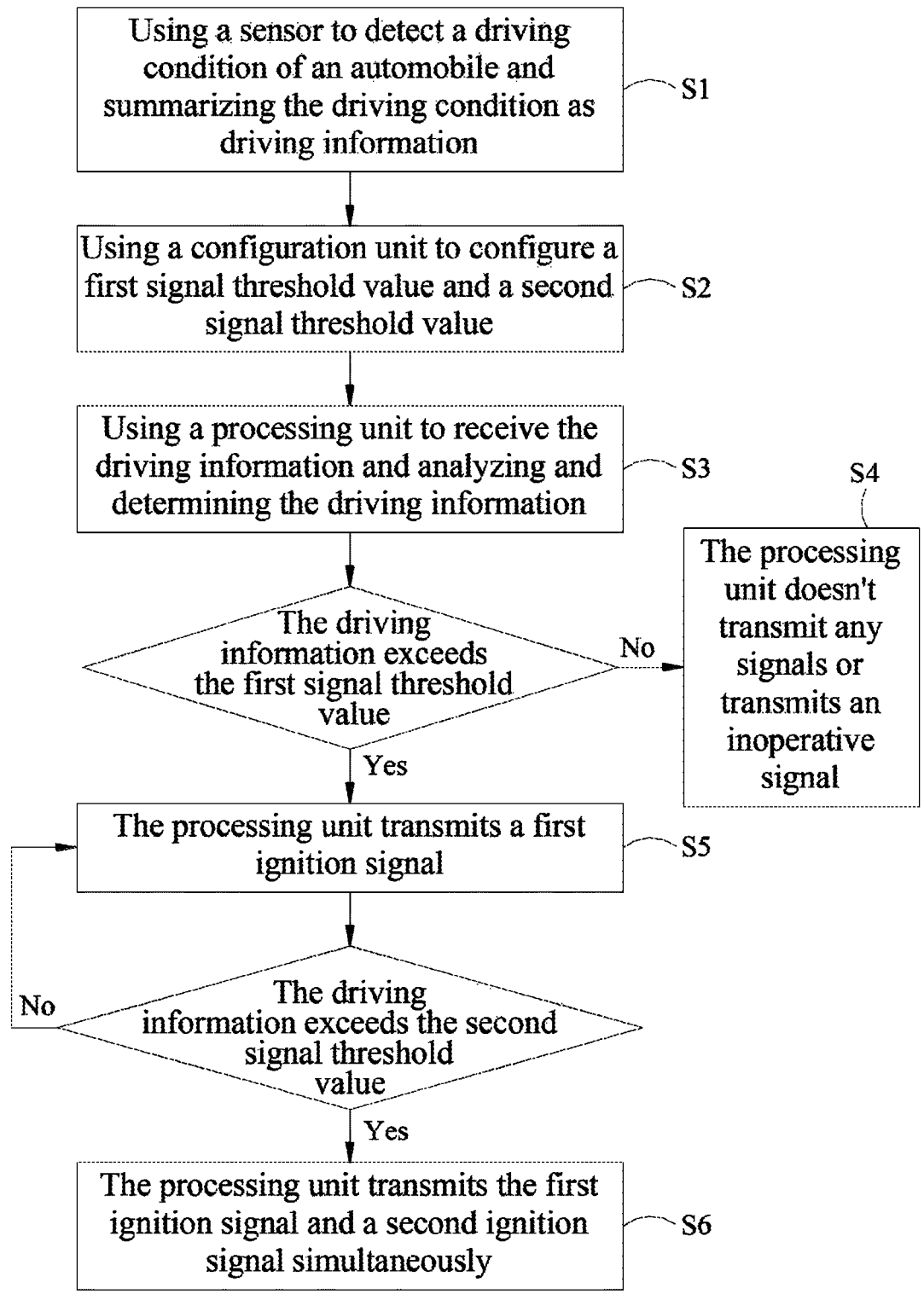
FIG. 6 is a flow chart for showing process of a triggering method of a dual-stage hybrid inflator of the present disclosure.

Please refer to FIG. 6. A method of triggering a dual-stage hybrid inflator may be applicable to an automobile equipped having an airbag with the dual-stage hybrid inflator. The automobile may include a sensor, a configuration unit and a processing unit. Wherein, the airbag using the dual-stage hybrid inflator may be disposed in the automobile and electrically connected with the electronic system of the automobile, and a different dosage of propellant is respectively filled in a first propellant chamber and a second propellant chamber of the dual-stage hybrid inflator according to the criteria of safety design.

The method may be referred as follows. In step S1, the sensor may be used to detect a driving condition of the automobile and then to summarize the driving condition as a driving information. Wherein, various sensors such as a weight sensor, a speed sensor, an acceleration sensor or a combination thereof may be used to detect the driving condition of the automobile, and the driving information such as passenger position, speed information, collision information, and so on may be summarized for the follow-up application. In practice, the weight can be adjusted according to the importance of the driving information during the process of the summarization, to obtain more accurate basis of determination.

In step S2, the configuration unit may be used to configure a first signal threshold value and a second signal threshold value. The first signal threshold value and the second signal threshold value may be configured based on information such as automobile's condition, driver's driving habit, airbag's assembly position, and so on.

In step S3, the processing unit may be used to receive the driving information and then to analyze and determine the driving information to produce a first ignition signal or a second ignition signal corresponding to the analysis and determination. The analysis and determination may be conducted according to the received driving information, the set first signal threshold value and the second signal threshold value.

In step S4, when the driving information does not exceed the first signal threshold value, it means that the automobile is in a safe driving condition, and the processing unit does not transmit any signals or may only transmit an inoperative signal to idle the dual-stage hybrid inflator.

In step S5, when the driving information exceeds the first signal threshold value, it means that the automobile may have collision or a slight crash, and the processing unit may transmit the first ignition signal to trigger the first igniter of the dual-stage inflator to generate the set gas volume, so as to complete the first inflation mode of the airbag to provide an adequate protection.

In step S6, when the driving information exceeds the second signal threshold value, it means that the automobile may have a strong collision, and thus, the processing unit may transmit the first ignition signal and the second ignition signal simultaneously to respectively trigger the first and second igniters of the dual-stage hybrid inflator to generate the gas so as to complete a second inflation mode of the airbag. As a result, the second inflation mode of the airbag may be completed rapidly within the security hour.

A dual-stage hybrid inflator in accordance with the present disclosure is to use the structure of doublet propellant chamber along with the arrangement of the related components to accomplish the purpose of microminiaturized design so as to reduce the requirement of the space for assembling. That is to say, the suitable field can be thereby extended. In addition, it can provide different degrees of protection by means of the design of the doublet propellant chamber and the transmission of different ignition signals based on various degrees of collision, so as to trigger different dosage of propellant. Besides, the hybrid inflator may be able to reduce temperature of gas such that burn can be avoided. Disposition of filter may be able to filter the solid slag to prevent foreign substance penetrating the airbag such that the usage security can be promoted concretely. Moreover, the requirement for the propellant may be lowered by using pre-filled gas so as to decrease the environmental toxicity caused by burning the propellant.

While the means of specific embodiments in present disclosure has been described by reference drawings, numerous modifications and variations could be made thereto by those skilled in the art without departing from the scope and spirit of the disclosure set forth in the claims. The modifications and variations should in a range limited by the specification of the present disclosure.

What is claimed is:
1. A dual-stage hybrid inflator, comprising:
a main casing comprising a bottom housing and an upper housing, the upper housing fixed at a top of the bottom housing relatively and the upper housing together with the bottom housing to form a complete sealed casing, a bottom wall of the bottom housing disposed with a first ignition hole and a second ignition hole, and a top wall of the upper housing disposed with a through hole;
a central pipe being a hollow pipe, a bottom of the central pipe fixed onto the bottom housing relatively, a top of the central pipe penetrating the through hole relatively to fix with the upper housing, and a pipe wall of the central pipe having a plurality of convective holes;
a disc set disposed at the top of the central pipe relatively to prevent gas escaping from the main casing, and separated from the top of the central pipe when an inner side of the disc set is pushed with force exceeding the strength of the disc set;

a first propellant chamber assembly comprising a cushion ring and a first cup cover, wherein the cushion ring is disposed at an internal circular wall of the bottom housing relatively; a center of the first cup cover is disposed with a sheath opening sheathed on the central pipe relatively, the first cup cover is disposed at a top of the cushion ring in order to form a first propellant chamber with the bottom housing, and the first propellant chamber is disposed with a propellant having a first dosage;

a second propellant chamber assembly disposed at the bottom housing and comprising a cup body of a second propellant chamber and a second cup cover, wherein the cup body of the second propellant chamber has a through hole fixed with the second ignition hole relatively, the cup body of the second propellant chamber is filled with a propellant having a second dosage, and the second cup cover has a shape relative to a shape of the cup body of the second propellant chamber and covers the cup body of the second propellant chamber;

a first igniter assembly penetrating through the first ignition hole to be disposed in the first propellant chamber, for producing a first ignition airflow after receiving a first ignition signal, so as to trigger the propellant having the first dosage to burn;

a second igniter penetrating through the second ignition hole and the through hole to be disposed in the cup body of the second propellant chamber, for producing a second ignition airflow after receiving a second ignition signal, so as to trigger the propellant having the second dosage to burn; and an exhaust hood sheathed and fixed on the main casing relatively, and a deposition space formed between the exhaust hood and the main casing for accommodating a solid residue produced after burning, and the exhaust hood having a plurality of exhaust holes for exhausting gas.

2. The dual-stage hybrid inflator of claim 1, wherein the disc set comprises a sealing cover and a sealing sheet, and the sealing cover has a port and is fixed at the top of the central pipe, and the sealing sheet is relatively fixed onto the port to prevent the gas escaping from the main casing, and the sealing sheet is opened when the inner side thereof is pushed with a certain degree of force.

3. The dual-stage hybrid inflator of claim 1, wherein the first igniter assembly further comprises a first indicator being a hollow casing, a first guiding aperture is provided to penetrate through a wall surface at one side of the first indicator, the first indicator is sheathed and fixed onto the first igniter assembly, and a direction of the first ignition airflow is guided by the first guiding aperture.

4. The dual-stage hybrid inflator of claim 1, wherein the second igniter assembly comprises a second indicator being a hollow casing, a second guiding aperture is provided to penetrate a wall surface at one side of the second indicator, the second indicator is sheathed and fixed onto the second igniter assembly, and a direction of the second ignition airflow is guided by the second guiding aperture.

5. The dual-stage hybrid inflator of claim 1, further comprising a vent pipe, wherein the vent pipe is sheathed and fixed at an external side of the central pipe relatively and a plurality of throttle bores are provided to penetrate through the vent pipe, the plurality of throttle bores are not aligned with the plurality of convective holes.

6. The dual-stage hybrid inflator of claim 1, wherein a bottom of the first propellant chamber and/or a bottom of the cup body of the second propellant chamber further comprises a buffer pad preventing the propellant from being broken by vibration, and the buffer pad comprises a ceramic fiber pad, a crotch pad or a thermal rubber pad.

* * * * *